UNITED STATES PATENT OFFICE.

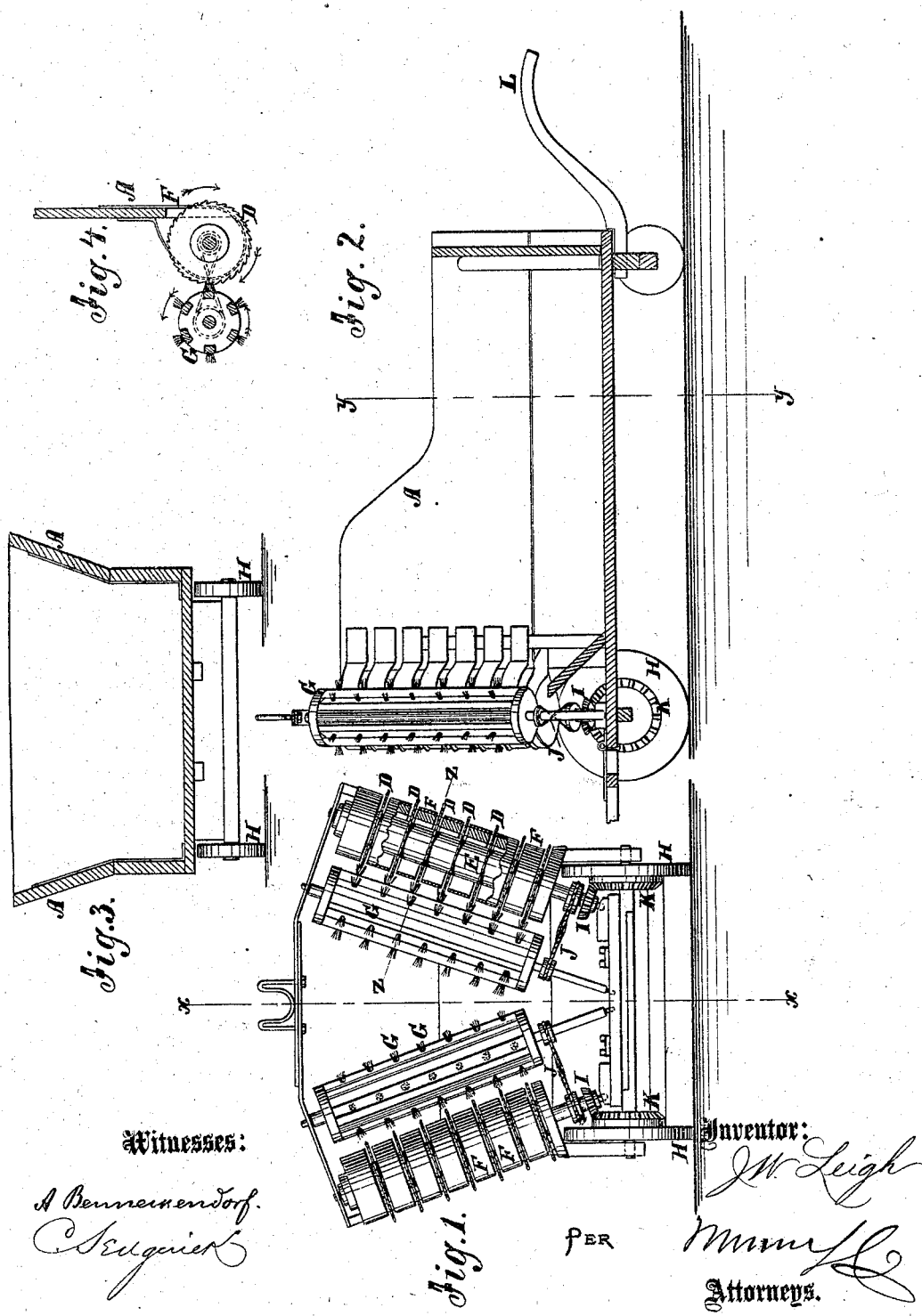

JAMES W. LEIGH, OF NORFOLK, VIRGINIA.

IMPROVEMENT IN COTTON-HARVESTERS.

Specification forming part of Letters Patent No. 136,924, dated March 18, 1873.

*To all whom it may concern:*

Be it known that I, JAMES W. LEIGH, of Norfolk, in the county of Norfolk and State of Virginia, have invented a new and Improved Cotton-Picker, of which the following is a specification:

My invention consists of a series of saws on an upright or approximately upright shaft at the front end of each of the side boards of a large box or hopper arranged on a low truck, the box being of such width that, running between two rows of cotton, the brush of each row will be pressed over to one side so that the saws which are kept running and work between guides from which the teeth project enough to catch the cotton, but not enough to cut the brush, will come in contact with about half the cotton or what may be reached from one side sufficiently to pull it off and carry it inside of the box, where revolving brush-strippers discharge it from the saws. The portion of cotton remaining on the brush will be taken off in the same manner when the machine returns along the other side of the row.

Figure 1 is a front elevation of my improved cotton-picking machine. Fig. 2 is a longitudinal sectional elevation taken on the line *x x* of Fig. 1. Fig. 3 is a transverse section taken on the line *y y* of Fig. 2, and Fig. 4 is a section taken on the line *z z* of Fig. 1.

Similar letters of reference indicate corresponding parts.

A represents the sides of the box or hopper, which is mounted on the low truck B, which is of such width that when drawn between two rows of cotton the hopper sides will crowd the brush of each row over to the middle or a little more, so that about half the cotton fiber will be exposed to the side of the hopper. To facilitate this the hopper sides are caused to incline against the row of cotton-brush from the bottom up. D represents a series of saws to each hopper side arranged on a mandrel, E, parallel with the hopper side, but sufficiently within to only allow the teeth to project sufficiently beyond the hopper side and the guards F between the saws to take the cotton without catching the brush sufficiently to do it material injury. G represents the revolving brushes arranged in connection with the saws for stripping off the cotton and discharging it into the box. The saw-arbors are geared to the forward truck-wheels H by bevel-wheels I K, which turn them in the right direction for carrying the cotton around the front side into the hopper, and the brushes are driven from the saw-arbors by crossed belts J, which turn them so as to brush the cotton off the said teeth back into the box; they also turn the brushes a little faster than the saws revolve.

The front axle of the truck must be prevented from turning as the front axles of wagons do, in order to work right with the saw-arbors; consequently if provision is to be made for steering or guiding the truck by such means the hind axle must be arranged to turn; but I prefer to have the hind axle fixed also, and guide the truck by lifting the hind end around sidewise by handles L, which I provide for the purpose.

For adjusting the machine to wide or narrow spaces between the rows, I propose to have the axles constructed so they can be extended or shortened.

Having thus described my invention, I claim as new and desire to secure by Letters Patent—

The series of picker-saws supported in front of the receiving-box and inclined outward to the rows of cotton-plants, substantially as specified.

J. W. LEIGH.

Witnesses:
   J. SELDEN BAGNALL,
   P. M. METCALF.